United States Patent [19]
Flolo

[11] Patent Number: 5,873,684
[45] Date of Patent: Feb. 23, 1999

[54] THREAD MILL HAVING MULTIPLE THREAD CUTTERS

[75] Inventor: Dennis P. Flolo, Friendswood, Tex.

[73] Assignee: Tool Flo Manufacturing, Inc., Houston, Tex.

[21] Appl. No.: 829,788

[22] Filed: Mar. 29, 1997

[51] Int. Cl.⁶ ..................................................... B23G 5/18
[52] U.S. Cl. .............................. 409/66; 408/222; 407/11; 407/47; 407/115; 409/65
[58] Field of Search ............................. 408/57, 59, 222; 407/11, 56, 59, 61, 40, 42, 47, 119, 115, 100; 409/66, 65, 74, 78

[56] References Cited

U.S. PATENT DOCUMENTS

| | | | |
|---|---|---|---|
| 1,184,368 | 5/1916 | Morgal | 407/47 |
| 3,273,223 | 9/1966 | Wright | 407/100 |
| 4,360,297 | 11/1982 | Weber . | |
| 4,409,868 | 10/1983 | Huddle et al. . | |
| 4,531,863 | 7/1985 | Smith . | |
| 4,575,888 | 3/1986 | Murén . | |
| 4,913,604 | 4/1990 | Zaengerle . | |
| 5,088,861 | 2/1992 | Little | 408/222 |
| 5,098,232 | 3/1992 | Benson . | |

FOREIGN PATENT DOCUMENTS 0 062 621 A2  10/1982  European Pat. Off. .

OTHER PUBLICATIONS

Machinery's Handbook, 25th Edition, pp. 1852–1854.
Wetmore Advertisement, Adjustment Reamers and Chucking Reamers.

*Primary Examiner*—Andrea L. Pitts
*Assistant Examiner*—Mark Williams
*Attorney, Agent, or Firm*—Browning Bushman

[57] ABSTRACT

A milling tool 8 includes a tool holder 10 for housing multiple thread cutting inserts 24 for precise milling of threads on a workpiece. The tool holder 10 is rotatable in an orbitable path spaced radially from a milling axis and is simultaneously rotatable about its own axis for repeatedly bringing each of the cutting inserts into engagement with the workpiece. Each cutting insert is precisely positioned within the tool holder by a stop surface 62 located at an axially rearward end of an insert cavity 28 in the tool holder. An axially elongate tool holder groove 32 is provided in communication with a side face of the generally rectilinear insert cavity. Each cutting insert defines a substantially rectangular plate, an end face for mating engagement with the stop surface 62 and an axially elongate insert groove 26 extending from a corresponding side face on the rectangular plate. A plurality of elongate pins 30 are each insertably engaged within each respective tool holder groove and insert groove, and are each secured by a plurality of screws 34 and 35 for applying a uniform force through the axis of the elongate pin for securing the respective cutting insert into a precise stabilized position within the tool holder.

20 Claims, 1 Drawing Sheet

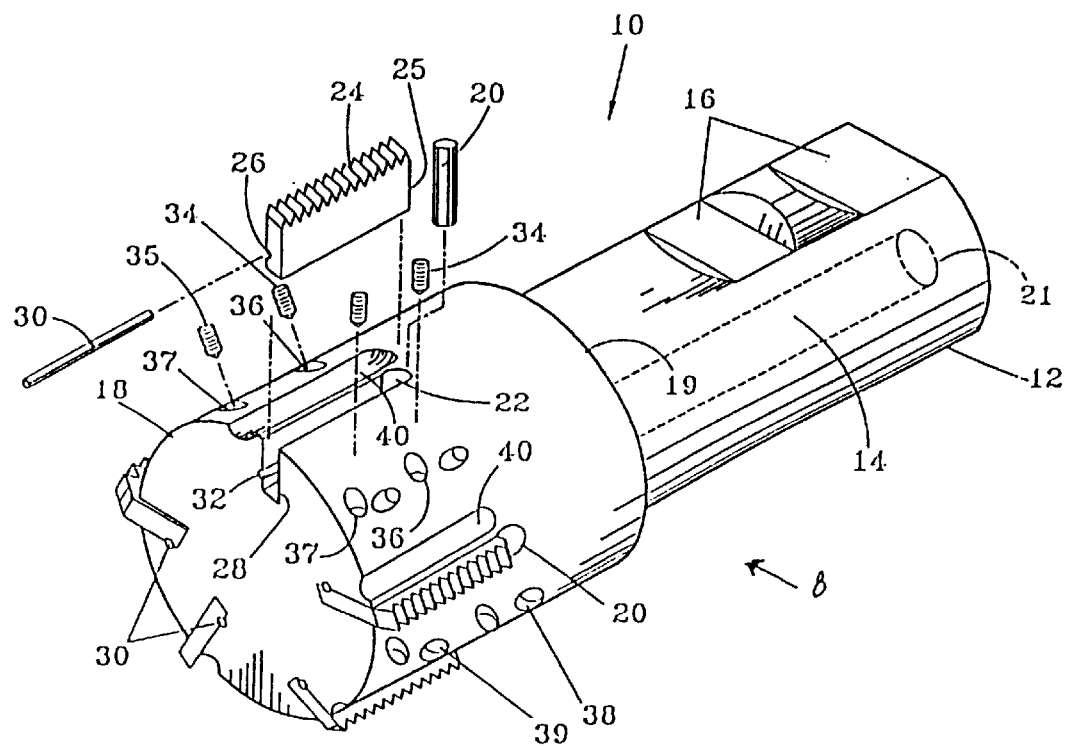
FIG. 1
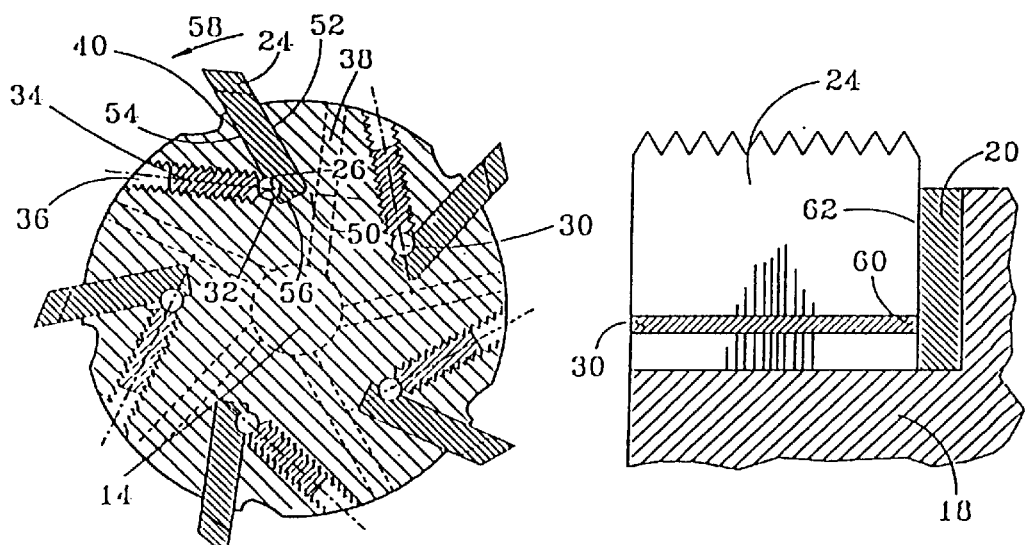
FIG. 2
FIG. 3

THREAD MILL HAVING MULTIPLE THREAD CUTTERS

FIELD OF THE INVENTION

The present invention relates to a thread milling tool including a tool holder for housing multiple thread cutting inserts for precise milling of threads on a workpiece.

BACKGROUND OF THE INVENTION

Cutting inserts are utilized in a variety of applications, including use in milling tools and reaming tools. A milling tool may be used for cutting threads, and is then commonly referred to as a thread mill. A reaming tool is used for reaming a hole in a workpiece. The relationship between a thread mill and a reaming tool is that each tool rotates during the cutting operation, and may include several cutting inserts thereon. Numerous differences otherwise exist, however, between a thread mill and a reaming tool.

Thread milling tools may be generally categorized as tools which are indexable or non-indexable. In either case, however, one or more inserts extend radially outward from a tool holder, with each insert including a plurality of cutting teeth positioned parallel or slightly tapered to the tool holder axis for cutting threads on a workpiece. The thread mill tool cutter thus exerts a torsional and radial force on the insert during the cutting operation. One or more cutting inserts on a reamer tool holder may enlarge holes and/or finish a drilled hole to required tolerances. The reamer tool holder rotates while moving along its axis of rotation and the insert, which includes the cutting surface, thus moves axially for reaming the hole. The reamer tool holder thus exerts an axial force on the insert during the reaming operation.

Cutting inserts on some adjustable reamers are secured within the reamer holder by a single screw and dowel assembly. Since the force encountered by a reamer on a workpiece is along the axis of the reamer, the mechanism for securing an insert in place on a reamer is markedly different than securing a threading insert on a milling tool. The functional distinction between reamers and thread milling tools is critical to stabilizing the cutting insert on the tool holder.

Numerous prior art patents are directed specifically to thread mills having multiple cutting inserts. U.S. Pat. No. 4,531,863 to Smith discloses a thread milling device with rotatable thread cutting inserts that are secured against four locating surfaces by two set screws angularly disposed through the cutting insert.

U.S. Pat. No. 4,360,297 to Weber also discloses a thread cutting insert and tool holder. The rotatable insert is secured to the tool holder by a clamp member that is connected to the tool holder and fits within a notch or depression on the insert for securing the insert against four adjacent walls of the tool holder.

U.S. Pat. No. 4,409,868 to Huddle et al. discloses a thread cutting tool having a multi-toothed first thread chaser secured between two adjacent walls by a top clamp and intermediate chip breaker. Also disclosed is a rotatable single tooth thread chaser insert secured within a pocket on the tool holder by both a locking screw passing through a central aperture in the insert into the threaded bore, and a top clamp secured to the tool holder by a clamp screw.

U.S. Pat. No. 4,575,888 to Muren discloses a thread cutting insert having a central aperture for mounting the insert to an indexable tool holder.

U.S. Pat. No. 5,098,232 to Benson discloses a thread milling tool having an insert which may be secured in a pocket of the thread milling tool by a screw extending through a hole in the insert and into a threaded hole in the bottom of the pocket.

E.P. No. 0062621 discloses a thread cutting tool having an indexable insert and shim plate supported against complimentary support surfaces of a recess in the thread cutting tool and secured jointly by a clamp consisting of two bores passing through the insert and shim plate into the thread cutting tool.

U.S. Pat. No. 4,913,604 to Zaengerle discloses a thread milling tool and trapezoidal milling plate secured against four surfaces of the thread milling tool by a countersunk clamping bolt passing through the center of the trapezoidal milling plate.

Numerous disadvantages are presented by the prior art relating to inserts that incorporate a plurality of cutting surfaces thereon, so that the insert can be rotated with respect to the holder when one cutting surface becomes worn, thus precluding the necessity of replacing the insert. Inserts with multiple cutting surfaces are typically secured to a holder by a single clamp or screw in order that the face of the cutting insert may be easily rotated to reveal new cutting edges with minimal delay. Consequently, the stability of the multi-cutting face insert during thread cutting operations is sacrificed. Conversely, once an insert with a single cutting face becomes worn, it must be replaced. The time required to replace the insert and securely remount the new insert on a tool holder is thus a disadvantage of tools with single cutting face inserts.

Disadvantages also exist when a single cutting face insert is secured to the tool holder by a single screw passing through a central axis perpendicular to the insert. For instance, stress may develops in the threaded connection between the screw, insert and tool holder during milling operations, thus reducing stability between the insert and tool holder and reducing the quality of the thread cutting operation.

Multiple screws have been used to secure an insert directly to the tool holder, as evidenced by U.S. Pat. No. 4,531,863 and E.P. No. 0062621, although significant disadvantages remain with these thread mills. Despite the fact that two or more screws are used, the force used to secure the insert to the tool holder is not consistently applied to the insert along the longitudinal axis of the cutting insert. Moreover, the inability to precisely position the cutting insert on the tool holder is increased by securing the insert with one or more screws. Finally, the time required to replace a cutting insert and reliably mount a new insert on a thread mill holder is a significant disadvantage of these prior art tools.

The disadvantages of the prior art are overcome by the present invention. An improved thread mill having multiple thread cutting inserts mounted thereon is hereafter disclosed which overcomes these and other difficulties experienced by prior art tools.

SUMMARY OF THE INVENTION

An improved milling tool according to the present invention includes a tool holder with multiple cutting inserts mounted thereon. Each insert may be precisely positioned on the tool holder and uniformly stabilized by a stop dowel pin and an elongate securing dowel pin. The thread milling tool is designed so that each cutting insert may be easily removed for efficient replacement of a worn insert with a new insert.

The thread milling tool may be used for milling either internal threads or external threads on a workpiece while the milling tool is rotated in an orbital path spaced radially from a milling axis. The tool holder is thus provided with a shank or an arbor-type mounting for attaching the milling tool to a rotatable spindle of a mill. The tool holder is preferably rotated about its tool holder axis while simultaneously rotating about the milling axis for repeatedly bringing each of the cutting inserts into threaded engagement with the workpiece, so that each of the multiple cutting inserts mounted on a tool holder wear in a substantially uniform manner. Each cutting insert is preferably fabricated from a tungsten carbide material, and includes a plurality of cutting teeth on a radially outward face of the insert and spaced axially along the tool holder axis for milling the threads on the workpiece when the tool holder is rotated both about the milling axis and the tool holder axis.

The tool holder includes a plurality of slots therein, with each slot defining a generally rectangular insert cavity for receiving a respective one of the plurality of cutting inserts. A stop pin having a pin axis extending radially outward to the outer side surface of the tool holder is mounted at the end of this slot, with the outer surface of the stop pin serving as a stop surface for axially positioning the cutting insert with respect to the tool body. The tool holder includes an elongate tool holder groove in communication with a side face of the generally rectilinear insert cavity, and a corresponding axially elongate insert groove is provided in the cutting insert. Each cutting insert may thus be secured with respect to the tool holder by an elongate pin which fits within the respective tool holder groove and insert groove. A plurality of screws each apply a compressive force to each elongate pin for pressing the pin against a respective one of the cutting inserts and thereby fixing the position of each cutting insert on the tool holder.

The thread milling tool preferably includes a central coolant passageway extending axially along the tool holder axis. A plurality of coolant discharge holes are provided each in fluid communication with the coolant passageway and extend from an outer side surface of the tool holder for passing coolant to the related one of the cutting inserts. The tool holder may also include a plurality of axial elongate channels in the outer side surface of the tool holder, with each channel being adjacent a respective one of the plurality of slots and corresponding cutting insert for guiding cutting chips when the cutting tool is rotated to cut threads on the workpiece.

According to the method of the present invention, a stop pin may be positioned at the end of each slot in the tool holder for providing a curvilinear stop surface for engagement with an end face of the respective cutting insert to precisely position axially each cutting insert on the tool holder. Each insert may then be positioned within a respect slot in the tool holder, and an elongate pin may be fitted within the respective tool holder groove and insert groove. A plurality of set screws may then be tightened to apply a force to the elongate pin to press the pin against the respective cutting insert and thereby fix the position of the cutting insert on the tool holder. With the milling tool then mounted on a mill, the tool holder may then be rotated in an orbitable path spaced radially uniform distance from the milling tool axis while simultaneously rotating the tool holder about the tool holder axis for cutting the threads in the workpiece. The coolant may be passed through a central coolant passageway in the tool holder and out a plurality of coolant holes each extending from the outer side surface of the tool holder for cooling the inserts while cutting the threads. A plurality of axially elongate channels may be provided in the outer surface of the tool holder for guiding the cutting chips when cutting threads on the workpiece.

It is therefore an object of the present invention to provide an improved milling tool and method of forming threads on a workpiece using a thread mill having a tool holder with multiple thread cutting inserts that are precisely stabilized within the tool holder, and may be easily removed for efficient replacement once an insert becomes worn.

A further object of this invention is a tool holder with multiple thread cutting inserts precisely positioned within an insert cavity in the tool holder by a stop pin inserted in a stop pin hole adjacent an axially rearward end of the insert cavity for axially positioning each cutting insert with respect to the tool holder.

It is another object of the present invention to provide a tool holder with multiple thread cutting inserts precisely stabilized within the tool holder by a plurality of elongate pins, each for fitting within a respective tool holder groove and insert groove, and a plurality of securing members for applying a force to the plurality of elongate pins for pressing each pin uniformly against each respective one of the cutting inserts and thereby fixing and stabilizing its position within the tool holder.

It is a feature of the present invention to provide a plurality of axially elongate channels in the outer side surface of the tool holder, each of the plurality of channels being adjacent each respective cutting insert and adapted for guiding cutting chips when the cutting tool is rotated to cut threads in the workpiece.

Another feature of the invention is a tool holder having at least four locating surfaces in engagement with each cutting insert for precisely stabilizing each cutting insert within the tool holder during the thread cutting operation.

It is another feature of the present invention to provide a central coolant passageway extending axially along the tool holder and a plurality of coolant discharge ports, each in fluid communication with the coolant passageway and extending from the outer side surface of the tool holder for passing coolant to each of the related cutting inserts.

It is an advantage of the invention that the durable cutting inserts may be easily fabricated from a tungsten carbide material, and the cutting inserts may then each be precisely mounted on a less expensive metal tool holder.

These and further objects, features, and advantages of the present invention will become apparent from the following detailed description, wherein reference is made to the figures in the accompanying drawings.

BRIEF DESCRIPTION OF THE DRAWINGS

FIG. 1 is an isometric exploded view of one embodiment of a thread milling tool according to the present invention;

FIG. 2 is a transverse cross-section of the tool shown in FIG. 1; and

FIG. 3 is a longitudinal cross-sectional view of a portion of the tool shown in FIG. 2 along a plane parallel with and directly in front of a face of a cutting insert.

DETAILED DESCRIPTION OF THE PREFERRED EMBODIMENTS

With reference to FIGS. 1–3, a milling tool 8 is shown, including an elongate tool holder 10 having substantially circular cross-section as shown by FIG. 2, and a plurality of cutting inserts 24. The specific embodiment set forth in FIGS. 1–3 is of a milling tool for cutting either internal threads or external threads on a workpiece (not shown) by rotating the milling tool in an orbital path by a conventional mill.

The tool holder 10 of the present invention has a substantially cylindrical mounting shank 12 including a pair of substantially transverse flat mounting surfaces 16 for securing the tool holder to a rotatable spindle of a mill. The substantially cylindrical mounting shank end 12 of tool holder 10 axially extends to shoulder 19 where it expands to form a larger diameter cylindrical cutting end 18.

The mounting shank 12 of tool holder 10 includes a coolant bore 14 axially extending through the tool holder 10. A threaded opening 21 is provided at a distal end of the tool holder for coupling to a source of coolant (not shown). The coolant bore 14 terminates within the cutting end 18 of the tool holder 10. Coolant ports 38 and 39 are circumferentially spaced about the cutting end 18 of the tool holder 10 and adjacent each cutting insert 24 for transmitting the coolant from the coolant bore 14 to each of the related cutting inserts 24 during a thread cutting operation.

The cutting end 18 of tool holder 10 includes a plurality of slots 28, each slot defining a generally rectilinear insert cavity for receiving a respective one of the plurality of cutting inserts 24 and extending radially outward to an outer side surface of the tool holder 10. Each slot also defines an axially elongate tool holder groove 32 in communication with a side face of the insert cavity. A plurality of stop surface dowel pins 20 each having a substantially cylindrical configuration are positioned within a corresponding cylindrical groove 22 adjacent the rearward end of insert cavity 28, and extend radially outward to an outer side surface of the tool holder 10 to form a stop surface 62 (see FIG. 3) for axially positioning each respective cutting insert 24 within the cutting end 18. Stop surface dowel pin 20, as seen by FIG. 3, forms a stop surface contact line 62 that provides precise positioning of the cutting insert 24 in a manner not economically feasible by providing a planar contact surface for engagement with an end surface of each cutting insert.

Each cutting insert 24 is preferably fabricated from a tungsten carbide material. Each insert defines a substantially rectangular plate including a radially outward cutting face with axially spaced cutter teeth thereon, an end face 25 for mating engagement with the stop surface 62 on the tool holder 10 and an axial elongate insert groove 26 extending from a side face of the rectangular cutting insert 24. After each cutting insert 24 is positioned within each rectangular slot 28 and adjacent the stop surface dowel pin 20, an elongate dowel pin 30 having a substantially cylindrical configuration is radially inserted into each respective axially elongate tool holder groove 32 and cutting insert groove 26. Once inserted, each elongate dowel pin 30 is secured against each respective cutting insert 24 by a plurality of set screws 34 and 35, each threadably engaged within respective corresponding threaded bores 36 and 37, thereby fixing and securing the exact position of each of the cutting inserts 24 on the tool holder 10.

The objects and advantages of the present invention are further seen by reference to FIG. 3 wherein each elongate dowel pin 30 is axially positioned against the stop surface dowel pin 20 at surface 60. As shown in FIG. 2, each dowel pin 30 is positioned between the tool holder groove 32 and cutting insert groove 26. Set screws 34 and 35 and elongate dowel pins 30 force each corresponding cutting insert 24 in a direction opposite to the rotation 58 of the tool holder.

The forces exerted on the cutting insert 24 by the set screws 34 and 35 and elongate dowel pin 30 are thus uniform along the axial length of the cutting insert 24 and stabilize each respective cutting insert 24 between tool holder slot side surfaces 52, 54, slot end surface 56, and axial stop surface 62. The force exerted by the set screws 34 and 35 against each respective cutting insert 24 along plane 50 causes each cutting insert 24 to fixedly stabilize against locating surfaces 52 and 56 due to the directed force being transmitted through at a point generally directed to the intersection of surfaces 52 and 56, and preferably slightly inward of the intersection between locating surfaces 52 and 56.

Once the milling tool 8 is assembled with each cutting insert 24 fixedly positioned and secured on the tool holder 10, the thread milling tool may be attached to a rotatable spindle of a mill (not shown) and rotated in a single orbitable path spaced radially from a central milling axis and about the workpiece, thereby cutting all the straight or tapered threads on the workpiece. During this orbital cutting operation, the tool holder is simultaneously rotated at a high rate of speed about the tool holder's own central axis, which preferably is coaxial with coolant passageway 14. This rotation will repeatedly bring each of the cutting inserts 24 into engagement with the workpiece, thereby cutting the desired thread on the workpiece. All the thread grooves on one insert thus simultaneously engage the workpiece to cut the threads and, since all the inserts assist in cutting the threads during the single orbit about the milling axis, all the inserts of the milling tool 8 wear at substantially the same rate and thus may be replaced in one service operation.

As each cutting insert 24 comes into engagement with the workpiece, chips removed from the workpiece by a cutting insert 24 may be guided away from the teeth on the cutting insert 24 by an axially elongate channel 40 formed adjacent each respective one of the plurality of cutting inserts 24. After the cutting inserts become uniformly worn as they contact the workpiece, it is advantageous to replace the cutting inserts as quickly as possible. Therefore, rapid replacement of the cutting inserts 24 is facilitated by simply backing out set screws 34 and 35, removing the elongate dowel pin 30 and replacing the worn cutting insert 24 with a new insert.

According to the method of the present invention, internal or external threads may be cut on a workpiece using the cutting tool as discussed above. To fix the position of each insert with respect to the tool holder, a stop pin 20 may first be press fit within each of the cylindrical passageways 22, thereby providing a curvilinear stop surface for line contact engagement with a respective insert 24 when positioned within a respective slot 28. With the insert firmly pressed against the stop pin 20, dowel pin 30 may be inserted into the generally cylindrical groove formed by the combination of the semi-cylindrical tool holder groove 32 and the semi-cylindrical insert groove 26. The set screws 34 and 35 may then be threadably tightened in order to apply a substantially uniform force to the elongate pin which presses the pin 30 against a respective cutting insert. The milling tool may then be mounted on the spindle of a suitable mill (not shown) and the milling tool rotated in an orbital path while simultaneously rotating the tool holder about central tool holder axis for cutting the threads on the workpiece. While cutting threads on the workpiece, coolant is preferably passed through the central coolant passageway 14 and out the plurality of coolant holes 36, 37 for cooling each insert while cutting the threads. The cutting chips are also preferably diverted by a suitable elongate channel 40 formed in an outer side surface of the tool holder.

Various modifications may be made to the milling tool as disclosed herein for reliably cutting a thread on a workpiece. For ease of manufacturing, the elongate pins 30 preferably have a cylindrical configuration. The corresponding axially elongate grooves in the tool holder and in each insert may be otherwise configured for receiving, for example, an elongate pin having a rectangular or an oval cross-sectional configuration. While set screws 34 and 35 are preferably provided for forcing each pin against a respective insert, various types of removable securing members could be provided for serving this function. Two set screws for each pin 30 are disclosed, although additional set screws may be used to ensure that each pin applies a substantially uniform force along its axial length to the insert. As noted above, it is a feature of the invention that the stop pin have a curvilinear outer surface for line contact engagement with the end of an insert. The stop pin preferably has a substantially cylindrical configuration, although in an alternative embodiment the stop pin could have another cross-sectional configuration and still provide a curved surface for line contact engagement with the end of the insert. In the embodiments illustrated in the drawings, the central axis of the stop pin lies in a plane perpendicular to the tool holder central axis and inclusion of the respective insert. The stop pin axis could be slanted relative to the plane of the slot so that only a portion of the insert end face engaged the stop pin. Various types of chip breaker grooves or chip guiding grooves may be provided on the outer surface of the tool holder for engagement with the chips cut by the threading operation, thereby increasing the efficiency of the thread cutting operation.

Various additional modifications to the present invention described herein should be apparent from the above description. Although the present invention has thus been described in detail for the preferred embodiment, it should be understood that this explanation is for illustration only and that the invention is not limited to the described embodiment or use. Alternative components and operating techniques should be apparent to those skilled in the art and in view of the disclosure. Modifications are thus, contemplated and may be made without departing from the spirit of the invention, which is defined by the claims.

What is claimed is:

1. A milling tool for milling threads on a workpiece, the milling tool including a tool holder rotatable in an orbital path spaced radially from a milling axis, the tool holder including a plurality of cutting inserts circumferentially spaced on the tool holder, the tool holder being rotatable about a tool holder axis while rotating about the milling axis for repeatedly bringing each of the cutting inserts into threading engagement with the workpiece, each cutting insert including a plurality of cutting teeth on a radially outward cutting face and spaced axially along the tool holder axis for milling the threads on the workpiece when the tool holder is rotated both about the milling axis and the tool holder axis, the milling tool further comprising:

the tool holder having a plurality of slots therein, each slot defining a generally rectangular insert cavity for receiving a respective one of the plurality of cutting inserts and extending radially outward to an outer side surface of the tool holder, a stop surface at an axially rearward end of the insert cavity for axially positioning a respective cutting insert with respect to the tool body, an axially elongate tool holder groove in communication with a front side face of the generally rectangular insert cavity, a rear side face of the generally rectangular insert cavity opposite the front side face, and a radially inward back surface of the generally rectangular insert cavity, the elongate tool holder groove having a tool holder groove axis parallel with the tool holder axis;

each cutting insert defining a substantially rectangular plate including a radially outward cutting face with the axially spaced cutter teeth thereon, an end face for engagement with the stop surface on the tool holder for axially positioning the insert with respect to the tool holder, and an axially elongate insert groove extending from a side face of the rectangular plate, the elongate insert groove having an insert groove axis parallel with the tool holder axis;

a plurality of elongate pins each for fitting within a respective tool holder groove and insert groove, each pin having a central pin axis parallel to the tool holder axis; and a plurality of securing members each having a securing member axis angled with respect to the substantially rectangular plate of a corresponding cutting insert for applying a force to the plurality of elongate pins for pressing each pin against a respective one of the cutting inserts in a direction toward both the rear side face and the back surface of a respective slot and thereby fixing the position of each of the cutting inserts on the tool holder.

2. The milling tool as defined in claim 1, wherein the plurality of securing members comprises a plurality of screws each adapted for threaded engagement with a corresponding screw hole in the tool body for pressing an end of each screw opposite a screw head against a respective one of the plurality of elongate pins.

3. The milling tool as defined in claim 1, wherein the tool holder has a central coolant passageway extending axially along the tool holder axis and a plurality of coolant discharge holes each in fluid communication with the coolant passageway and extending from the outer side surface of the tool holder for passing coolant to the related one of the cutting inserts.

4. The milling tool as defined in claim 1, wherein the stop surface is provided on a stop pin having a pin axis extending radially outward to the outer side surface of the tool holder.

5. The milling tool as defined in claim 4, wherein the stop pin is a dowel pin having a substantially cylindrical configuration for fitting within a stop pin hole having a substantially cylindrical configuration within the tool holder.

6. The milling tool as defined in claim 1, further comprising:

a plurality of axially elongate channels in the outer side surface of the tool holder, each of the plurality of channels being adjacent a respective one of the plurality of slots and a corresponding cutting insert, each channel being adapted for guiding cutting chips when the cutting tool is rotated to cut threads in the workpiece.

7. The milling tool as defined in claim 1, wherein the force applied by each of the securing members is aligned with a central axis of the respective securing member.

8. The milling tool is defined in claim 1, wherein each securing member applies a force generally directed to an intersection of the rear side face and the back surface of a respective slot.

9. A milling tool for milling threads on a workpiece, the milling tool including a tool holder rotatable in an orbital path spaced radially from a milling axis, the tool holder including a cutting insert on the tool holder, the tool holder adapted for attaching to a rotatable spindle of a mill, the cutting insert including a plurality of cutting teeth on radially outward cutting face and spaced axially along a tool holder axis for milling external or internal threads on the workpiece when the holder is rotated about the milling axis while simultaneously being rotated about the tool holder axis, the milling tool further comprising:

the tool holder having a slot therein, the slot defining a generally rectangular insert cavity for receiving the cutting insert and extending radially outward to an outer side surface of the tool holder, and an axially elongate tool holder groove in communication with a side face of the generally rectangular insert cavity;

a stop pin for fitting within a stop pin hole within the tool holder, the stop pin having a pin axis extending radially outward to an outer side surface of the tool holder, the stop pin defining a stop surface thereon;

the cutting insert defining a substantially rectangular plate formed from a tungsten carbide material and including the radially outward cutting face with the axially spaced cutter teeth thereon, an end face for engagement with the stop surface on the stop pin for axially positioning the insert with respect to the tool holder, and an axially elongate insert groove extending from a side face of the rectangular plate;

an elongate pin and for fitting within the tool holder groove and the insert groove; and a plurality of securing members for applying a force to the elongate pin for pressing the pin against the cutting insert and thereby fixing the position of the cutting insert on the tool holder.

10. The milling tool as defined in claim 9, wherein the elongate pin is a dowel pin having a substantially cylindrical configuration.

11. The milling tool as defined in claim 9, wherein the plurality of securing members comprises of plurality of screws each adapted for threaded engagement with a corresponding screw hole in the tool holder for pressing an end of each screw against the elongate pin.

12. The milling tool as defined in claim 11, wherein each of the screw holes are angled on the tool holder for pressing the cutting insert toward a radially inward back surface of the respective slot.

13. The milling tool as defined in claim 12, wherein each of the screw holes is angled on the tool holder for pressing the cutting insert toward a rear side face of the respective slot.

14. The milling tool as defined in claim 9, wherein the tool holder has a central coolant passageway extending axially along the tool holder axis and a plurality of coolant discharge holes each in fluid communication with the coolant passageway and extending from the outer side surface of the tool holder for passing coolant to the insert.

15. The milling tool as defined in claim 9, further comprising:

an axially elongate channel in the outer side surface of the tool holder, the channel being adjacent the slot and the cutting insert for guiding cutting chips when the cutting tool is rotated to cut threads in the workpiece.

16. The method of cutting threads on a workpiece with a cutting tool, the cutting tool including a tool holder having a cutting insert thereon, the cutting insert including a plurality of radially outward cutting teeth spaced along the tool holder axis for cutting threads on the workpiece, the method comprising:

providing a slot in the tool holder, the slot defining a generally rectangular insert cavity for receiving the cutting insert and extending radially outward to an outer side surface of the tool holder;

providing a stop surface at an axially rearward end of the insert cavity and an axially elongate tool holder groove in communication with a front side face of the generally rectangular insert cavity, a rear side face of the generally rectangular insert cavity being opposite the front side face, and a radially inward back surface of the generally rectangular insert cavity, the elongate tool holder groove having a tool holder groove axis parallel with the tool holder axis;

providing a cutting insert defining a substantially rectangular plate including the radially outward cutting face with the axially spaced cutting teeth thereon, the rectangular plate having an end face for mating engagement with the stop surface on the tool holder and an axial elongate insert groove extending from a side face of the rectangular plate, the insert groove having an insert groove axis parallel with the tool holder axis;

positioning the end face of the cutting insert into engagement with the stop surface on the tool holder;

moving an elongate pin along a pin axis parallel to the tool holder axis to fit the elongate pin within the respective tool holder groove and insert groove;

applying a force to the elongate pin to press the pin against the cutting insert in a direction toward both the rear side face and the back surface of a respective slot and thereby fix the position of the cutting insert on the tool holder; and rotating the tool holder in an orbital path spaced radially a uniform distance from a milling tool axis while simultaneously rotating the tool holder about the tool holder axis for cutting the threads on the workpiece.

17. The method as defined in claim 16, further comprising:

providing the tool holder with a plurality of cutting inserts each positioned for selected engagement with the workpiece while rotating the tool holder about the tool holder axis.

18. The method as defined in claim 16, further comprising:

passing a coolant through a central coolant passageway in the tool holder and out a plurality of coolant holes each extending from the outer side surface of the tool holder for cooling the insert while cutting the threads.

19. The method as defined in claim 16, further comprising:

providing the stop surface on a stop pin; and positioning the stop pin in a stop pin hole extending radially outward to the outer side surface of the tool holder, thereby positioning the stop surface on the tool holder.

20. The method as defined in claim 16, further comprising:

providing an axially elongate channel in an outer side surface of the tool holder, the channel being adjacent the slot and the cutting insert for guiding cutting chips when the cutting tool is rotated to cut threads on the workpiece.

* * * * *